April 13, 1926. 1,580,905

A. W. KOGSTROM

AIR STRAINER

Filed June 18, 1925     2 Sheets-Sheet 1

Inventor
Axel W. Kogstrom
By
Attorney

April 13, 1926.
A. W. KOGSTROM
AIR STRAINER
Filed June 18, 1925  2 Sheets-Sheet 2
1,580,905
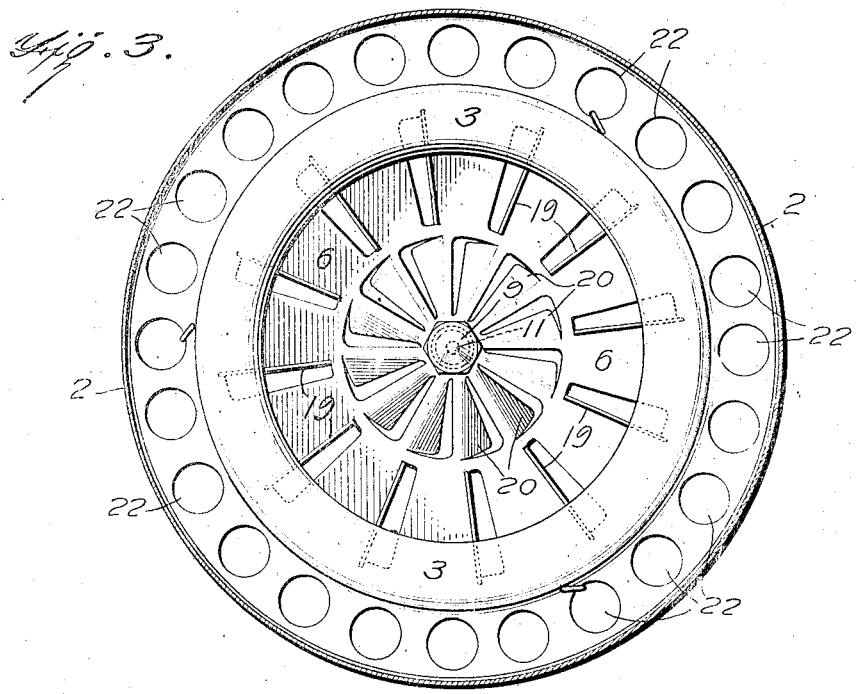
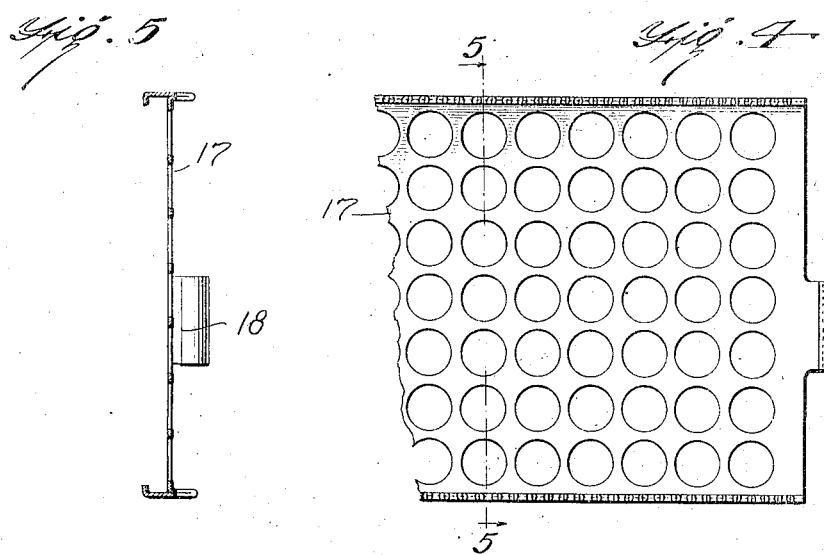

Patented Apr. 13, 1926.

1,580,905

UNITED STATES PATENT OFFICE.

AXEL W. KOGSTROM, OF UPPER DARBY, PENNSYLVANIA, ASSIGNOR OF ONE-HALF TO ALLISON F. H. SCOTT, OF PHILADELPHIA, PENNSYLVANIA.

AIR STRAINER.

Application filed June 18, 1925. Serial No. 38,011.

*To all whom it may concern:*

Be it known that I, AXEL W. KOGSTROM, a subject of the King of Sweden, and a resident of Upper Darby, in the county of Delaware and State of Pennsylvania, United States of America, have invented a new and useful Improvement in Air Strainers, of which the following is a specification.

This invention relates to air cleaners for use principally in cleaning the air which is fed to a carbureter to form with gas the explosive charge in internal combustion engines and the like.

Heretofore, strainer type filters have been used as air cleaners, but for efficient operation such filters must be of such large dimensions that they are not well suited for convenient use on automobiles, where the available space for mounting such a device is limited.

The object of this invention is to produce an air strainer having high cleaning efficiency and at the same time one which will require only a limited amount of space for its installation.

With this object in view, I have produced an air cleaner in which the air is first subjected to the action of a centrifugal separator, to remove the larger and heavier particles of dirt and dust, and the partially cleaned air is then passed through a filter to remove the remaining finer solid particles or suspended matter which is injurious to the mechanism of an internal combustion motor.

It will be apparent that for any given filter having the highest possible efficiency, by first passing the air to be treated through a centrifugal separator having an efficiency of say, 75%, the useful life of the filter will be four times as great as where the filter alone is used. Thus, by removing a substantial portion of the dirt and dust from the air by centrifugal means, the filter can be made materially smaller with a resulting decrease in the amount of space required by the cleaner as a whole.

Further, in carrying out the object of the invention I have produced a novel centrifugal separator to be used in the cleaner which is extremely simple, compact and light. The separator is preferably made of aluminum or other light metal to decrease the weight, and this feature, together with its compactness, go to make a very efficient device. The lightness of the rotating element of the separator also reduces friction losses at bearing points, and to maintain these losses as low as possible, a novel construction of bearing for this element is employed by using a sharply pointed or needle-point rod enclosed within a tube which at the lower end is provided with a dust-proof washer.

Another novel feature of the invention is a filter unit having a large effective filter surface, arranged in compact form.

The invention is shown in the accompanying drawing, in which—

Fig. 3 is a sectional view of the cleaner taken along line 3—3 of Fig. 1 illustrating the details of the centrifugal separator and the arrangement of the intake ports;

Figs. 4, 5 and 6 show the details of the supporting framework of the filter element, Fig. 5 being a sectional view on line 5—5 of Fig. 4.

Figure 1:
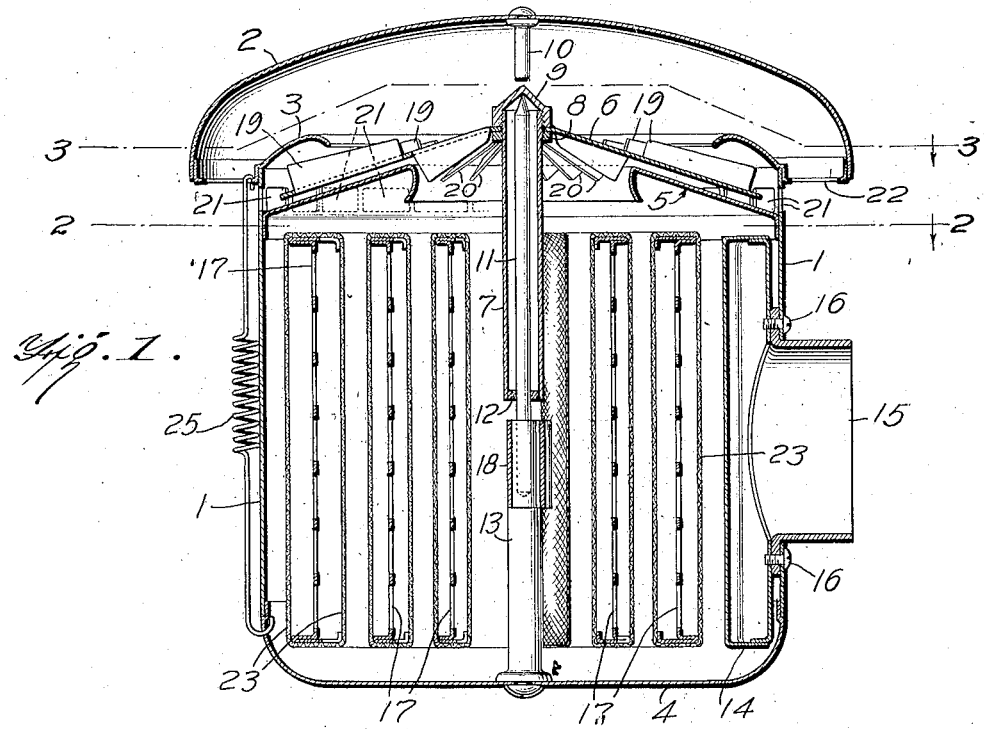
Fig. 1 is a vertical section taken through the center of the combined centrifugal separator and filter.

In Fig. 1, the main housing or casing of the cleaner indicated at 1, is shown as cylindrical in shape. The casing is provided with a cover 2, which is removably supported thereon, an annular shoulder on the baffle plate 3 fitting loosely over the upper edge of the housing 1. The baffle plate is also annular in shape and the outer edge may be secured to the bottom edge of cap 2, as by spot welding or riveting. A series of holes 22, is provided around the outer edge of the baffle plate, between the edge of the cap 2 and casing 1, to serve as intake ports for the air to be cleaned, see Figs. 1 and 3. The inner portion of baffle plate 3, lying immediately over the upper edge of casing 1, and comprising an inwardly and downwardly curving surface, is the baffle portion of the plate and is so formed that the incoming air from holes 22 is directed upwardly and to the center of the casing and thence toward the turbine blades of the centrifugal separator.

Another annular baffle plate 5 is secured as by spot weld or riveting within and near the top of casing 1. The purpose of this baffle plate is to confine the air flow to a central opening in which the turbine blades are mounted, and serves also to direct the solid particles of dirt or dust, separated by the separator, out through openings 21 in the upper edge of the casing.

The effectiveness of the centrifugal separator is improved by the relative arrangement of the turbine blades and the so-called impeller blades, since the air currents which acting against the turbine blades and thereby produce rotation of the separator element, are to a large degree such currents as pass through the space beneath the cover and directly to the turbine blades without loss in kinetic energy by contact with the impeller blades. The air which is centrifugally treated is mostly shunted by the turbine blades by passing through the openings in disk 6, which are formed in striking up the blades 19.

The casing 1 is provided with a removable bottom 4, in the center of which is secured an upwardly projecting stud 13. In the upper end of the stud there is secured one end of a steel wire or rod 11, which at its opposite end is ground to a point and hardened to serve as a pivot upon which the rotary element of the centrifugal separator is mounted.

The rotary element of the separator consists of a flat conical disk 6, provided with a set of up-standing impeller blades 19, around its outer portion, and a set of inclined turbine blades 20 at its inner portion and immediately above the central opening in baffle plate 5. The disk 6, is supported at its center on a tube 7 which is secured thereto by means of ring 8 and pivot nut 9. The inside of nut 9, is coned to afford a bearing point for the rod or pivot 11. The lower end of tube 7 is provided with a fiber washer 12 which fits snugly over rod 11 and serves not only as a lower bearing for the rotary element of the separator but also as a seal to keep dust and dirt from entering and clogging the pivot bearing at the upper end of the tube. The rotary element of the separator is limited in permissible vertical play, by means of the downwardly projecting stud 10, secured to the cap 2, and dimensioned to provide slight clearance between its lower end and the outer surface of the nut 9.

Figure 2:
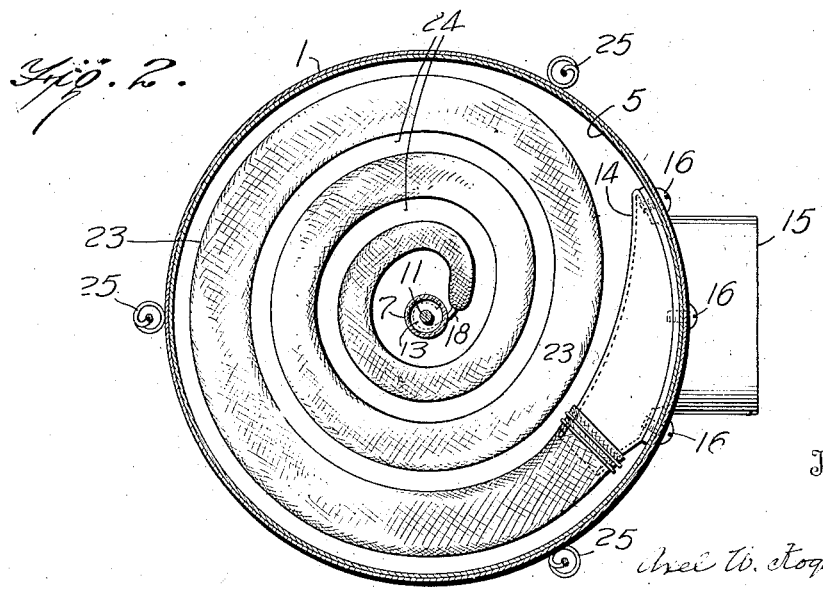
Fig. 2 is a sectional view of the cleaner taken along the line 2—2 of Fig. 1 showing particularly the arrangement of the filter element.

The filter element occupies the lower part of casing 1, as shown in Figs. 1 and 2, and consists essentially of a flat, tapering filter bag coiled into a spiral within the casing 1, and with its mouth end communicating with the outside by means of a specially formed passage 14, and outlet 15, the formed passage and outlet being secured to the wall of casing 1 by suitable fastening means 16. The filter bag is supported upon a flexible frame 17, the details of which are shown in Figs. 4 to 6. This frame comprises a strip of sheet metal provided with tapering, flanged edges formed integral with the strip as shown in Figs. 5 and 6. At the small end of the strip a tongue is formed into a cup or sleeve 18. This sleeve fits around the upper end of stud 13, and serves to anchor and position the small end of the filter bag. The filter bag proper may be made of felt or other suitable material and takes the shape of a long, tapering bag of such dimensions that it may be drawn over the frame-work 17.

The edges of the frame are notched, as shown in Fig. 6 to permit flexing so that the bag may be coiled into spiral form and inserted within the casing 1. The vertical web of strip 17 is also perforated with a large number of holes to permit ready passage of air from one half of the bag to the other. The mouth of the bag and the large end of frame-work 17 are secured to passage 14 which communicates with outlet 15. The latter is constructed in a way to make a convenient connection with the air-intake port of a carbureter.

The bottom 4 is provided with a slightly reduced upper edge portion which telescopes within the casing 1 and is loosely held therein. Also, the cap 2, is loosely held upon the casing 1, by a telescoping connection between baffle plate 3 and the upper end of casing 1. In order to hold these parts assembled a number of spring hooks 25, are provided around and on the outside of the strainer to hold the cap and bottom in position on the casing. One end of the hook engages a hole in baffle plate 3 while the other end engages a hole in the edge of bottom 4, and the resilient action of the spring hooks is sufficient to keep the parts tightly seated.

The above described construction permits ready access to either the centrifugal separator or the filter unit. This feature is a decided advantage where for any reason one or more of the parts requires renewal or adjustment, or for cleaning either the filter or the filter receptacle.

The operation of the air cleaner is as follows: The device is usually located close to the carbureter and below the central part of the radiator where the bulk of the air enters under the hood. The first step of separation takes place before the air actually enters the cleaner, for air approaching the cleaner is directed downwardly, and the heavier particles of dirt or solid matter will either strike the top of the cover, or by their inertia, will continue down past the edge of the cover. The lighter dust laden air, however, will be drawn into the casing through inlet openings 22 in baffle plate 3.

It is not entirely certain the precise paths that the air currents will take within the casing, but as already described, there will be currents directed to the turbine blades to produce rotation and other portions of the incoming air will be acted upon by the whirling impeller blades 19. The air which is so treated will have the solid matter carried in suspension thrown outwardly under the influence of centrifugal force, and this matter will escape by outlet openings 21, and thereby prevented from passing to the filter.

The final step of separation takes place when the partially cleaned air passes through the walls of the filter bag. The convolutions of the spiral-shaped bag are separated from each other by spaces 24, thus allowing the air to circulate on all sides of the bag. This particular form of filter, as will be seen, is highly efficient from the stand point of presenting a maximum amount of filtering surface, in a given space.

An important feature of this invention is the simplicity of construction of the centrifugal separator. It is to be noted that both sets of blades are formed integral with the disk element 6, by being struck-up therefrom.

While the invention has been described as applied to automobile engines in which the air is drawn through the cleaner by suction, it is obvious that the cleaner is capable of use in any situation where it is desired to clean a supply of air, regardless of whether the air is passed through the cleaner by suction or under positive pressure.

What I claim is:

1. In an air cleaner, the combination of a filter chamber provided with inlet and outlet passages, a filter arranged within the chamber and over the outlet passage, a centrifugal separator arranged within the inlet passage comprising turbine blades and impeller blades, whereby air passing through the cleaner causes the turbine blades to rotate to drive the impeller blades and thereby clean the air by centrifugal action.

2. In an air cleaner, the combination of a filter chamber provided with an outlet passage, a filter arranged within the chamber and over the outlet passage, a baffle plate arranged in the top of the chamber and provided with a central opening, a cover for the chamber extending above and beyond the outer edge of the chamber, the space between the edge of the cover and the chamber serving as an intake port for the air, and a centrifugal separator arranged in the space between the cover and the chamber comprising a rotary element having turbine blades mounted to rotate within the central opening in the baffle plate and impeller blades arranged to rotate within the space between the cover and the chamber, whereby air passing through the cleaner drives the turbine and is cleaned by centrifugal action of the impeller blades.

3. An air cleaner comprising a cup-shaped filter chamber provided with an outlet passage and a series of holes around its upper edge, a filter arranged within the chamber and over the outlet passage, a baffle plate arranged within the mouth of the chamber below the holes and provided with a central opening, a cover for the chamber comprising an inverted cup of larger diameter than the chamber and supported over the mouth of the chamber, the space between the cover and chamber serving as an inlet port for the air, an annular baffle plate supported on the upper edge of the chamber and serving to direct the air upwardly into the cover and towards the central opening in the first baffle plate, and a centrifugal separator arranged within the space between the cover and the chamber comprising a rotary element having turbine blades arranged to rotate within the central opening of the first baffle plate and impeller blades arranged to rotate between the two baffle plates, whereby air passing through the cleaner rotates the separator and particles of dust and dirt are separated from the air to be thrown out through openings around the upper edge of the chamber.

4. An air cleaner comprising a cylindrical filter chamber provided with inlet and outlet passages, a filter arranged within the chamber and comprising a relatively long filter bag spirally coiled with spaced convolutions within the chamber, the mouth of the bag being secured over the outlet passage, means secured to the bottom of the chamber and extending upwardly through the spiral and supporting the closed end of the bag, a vertical rod secured to said supporting means and extending upwardly into the inlet passage, and a centrifugal separator pivotally supported upon the upper end of the rod and comprising a rotary member having formed thereon a set of turbine blades and a set of impeller blades, the turbine blades being arranged over the inlet opening, whereby air passing through the cleaner operates the separator to free the incoming air from solid particles of dust and dirt.

5. In an air cleaner, a centrifugal separator comprising a disk element having formed integral therewith a set of turbine blades and a set of impeller blades, and means for pivotally supporting the turbine blades over the intake passage of the cleaner.

6. In an air cleaner, a centrifugal separator comprising a disk element having formed integral therewith, a set of turbine blades and a set of impeller blades, and means for pivotally supporting the disk element comprising a tube secured at one end to the center of the disk, a pivot rod extending through the tube to the plate with a washer inserted in the free end of the tube and fitting snugly around the pivot rod whereby a dust-proof seal is provided for the pivot bearing.

7. In an air cleaner, a centrifugal separator comprising a disk element having formed integral therewith a set of turbine blades in its central portion and a set of impeller blades around its outer portion, and means for pivotally supporting the disk with the turbine blades over the air intake passage of the cleaner.

8. A rotary element for a centrifugal separator comprising a disk element having formed integral therewith a set of turbine blades and a set of impeller blades radially displaced therefrom.

9. A rotary element for a centrifugal separator comprising a disk element having struck-up from its surface a set of turbine blades and a set of impeller blades, the turbine blades lying near the center of the disk and the impeller blades near the outer edge.

10. In an air cleaner, a filter element comprising a relatively long filter bag supported upon a flexible self-sustaining frame-work and coiled into a spiral with spaced convolutions.

11. A supporting frame for a filter bag comprising a strip of perforated sheet material having formed at each edge a flange tapering from one end to the other, said flanges being notched at intervals to permit transverse flexing of the frame.

12. In an air cleaner, a filter chamber comprising a main cylindrical element, a bottom for the chamber telescoping within the element, a top for the chamber telescoping over the opposite end of the cylindrical element, and means for holding the elements together comprising a plurality of spring hooks arranged around the chamber, opposite ends of the hooks being fastened respectively to the top and bottom of the chamber.

AXEL W. KOGSTROM